United States Patent
Sheoran et al.

(10) Patent No.: US 7,540,142 B2
(45) Date of Patent: Jun. 2, 2009

(54) MULTIPLE AUXILIARY POWER UNIT SYSTEM INLET DUCTS CONTROLLED BY A SINGLE ACTUATOR

(75) Inventors: Yogendra Y. Sheoran, Scottsdale, AZ (US); John G. Zimmerer, Paradise Valley, AZ (US); Kyle D. Asplund, Wichita, KS (US)

(73) Assignee: Honeywell International Inc., Morristown, NJ (US)

( * ) Notice: Subject to any disclaimer, the term of this patent is extended or adjusted under 35 U.S.C. 154(b) by 404 days.

(21) Appl. No.: 11/473,936

(22) Filed: Jun. 23, 2006

(65) Prior Publication Data

US 2007/0193277 A1    Aug. 23, 2007

Related U.S. Application Data

(60) Provisional application No. 60/775,445, filed on Feb. 21, 2006.

(51) Int. Cl.
*F02C 7/12* (2006.01)
(52) U.S. Cl. .............. 60/39.83; 244/53 B; 244/58; 137/15.1; 137/15.2
(58) Field of Classification Search .......... 60/802, 60/39.02, 39.83; 55/306; 244/53 B, 58; 137/15.1, 15.2
See application file for complete search history.

(56) References Cited

U.S. PATENT DOCUMENTS

| | | | |
|---|---|---|---|
| 3,489,377 A | | 1/1970 | Pearson et al. |
| 4,174,083 A | | 11/1979 | Mohn |
| 4,418,879 A | * | 12/1983 | Vanderleest ............... 244/53 B |
| 4,655,413 A | | 4/1987 | Genssler et al. |
| 5,165,228 A | | 11/1992 | Enderle |
| 5,655,359 A | | 8/1997 | Campbell et al. |
| 6,247,668 B1 | * | 6/2001 | Reysa et al. .................... 244/58 |
| 6,264,137 B1 | * | 7/2001 | Sheoran .................... 244/53 B |
| 6,272,838 B1 | | 8/2001 | Harvell et al. |
| 6,349,899 B1 | | 2/2002 | Ralston |
| 6,896,003 B1 | * | 5/2005 | Gieseke .................. 137/899.4 |
| 6,901,737 B2 | | 6/2005 | Schnoor |
| 2004/0060278 A1 | * | 4/2004 | Dionne ...................... 60/39.83 |
| 2005/0224635 A1 | | 10/2005 | Hein et al. |
| 2006/0102779 A1 | * | 5/2006 | Campbell et al. ......... 244/53 B |

* cited by examiner

*Primary Examiner*—Michael Cuff
*Assistant Examiner*—Phutthiwat Wongwian
(74) *Attorney, Agent, or Firm*—Ingrassia Fisher & Lorenz, P.C.

(57) ABSTRACT

An auxiliary power unit (APU) compartment air inlet system seals, via one or more inlet doors driven by a single actuator, an APU compartment, and isolates the APU inlet and cooling system inlets from each other. The system includes either one or two inlet doors, depending on the number of ram air inlets formed in the APU compartment. In either instance, however, a single actuator is used to move the inlet door(s) between open and closed positions.

13 Claims, 5 Drawing Sheets

MULTIPLE AUXILIARY POWER UNIT SYSTEM INLET DUCTS CONTROLLED BY A SINGLE ACTUATOR

CROSS-REFERENCES TO RELATED APPLICATIONS

This application claims the benefit of U.S. Provisional Application No. 60/775,445, filed Feb. 21, 2006.

TECHNICAL FIELD

The present invention relates to aircraft mounted auxiliary power unit system inlet ducts and, more particularly, to multiple inlet ducts for APU systems that are controlled by a single actuator.

BACKGROUND

In many aircraft, the main propulsion engines not only provide propulsion for the aircraft, but may also be used to drive various other rotating components such as, for example, generators, compressors, and pumps, to thereby supply electrical and/or pneumatic power. However, when an aircraft is on the ground, its main engines may not be operating. Moreover, in some instances the main propulsion engines may not be capable of supplying the power needed for propulsion as well as the power to drive these other rotating components. Thus, many aircraft include an auxiliary power unit (APU) to supplement the main propulsion engines in providing electrical and/or pneumatic power. An APU may also be used to start the propulsion engines.

An APU is, in most instances, a gas turbine engine that includes a combustion system, a power turbine, and a compressor. During operation of the APU, the compressor draws in ambient air, compresses it, and supplies compressed air to the combustion system. The combustion system receives fuel from a fuel source and the compressed air from the compressor, and supplies high-energy combusted air to the power turbine, causing it to rotate. The power turbine includes a shaft that may be used to drive a generator for supplying electrical power, and to drive its own compressor and/or an external load compressor.

Typically, APUs and associated cooling systems are mounted in a compartment in the aft section of the aircraft, at or near the aircraft tailcone section. The aircraft typically includes at least one air inlet and one exhaust outlet to allow sufficient air flow into and through the APU. Many aircraft include more than one air inlet to support APU operations. One air inlet may provide air flow to the APU compressor, while the other air inlet may provide air flow for oil and compartment cooling. More specifically, the APU is typically lubricated with air-cooled lubricant, such as oil, that flows through an oil cooler, and across which a flow of cooling air is also directed. This flow of cooling air may also provide air cooling for the APU and the APU compartment.

Many APU systems include passive, eductor driven cooling systems to provide both oil and APU compartment cooling. Passive, eductor driven cooling systems typically include an inlet scoop that may be positioned inside the APU inlet duct. The scoop diverts a portion of the air flow in the inlet duct through an outlet in the wall of the inlet duct. These systems typically need a positive pressure gradient across the cooling system for optimum operation in flight. To achieve this positive pressure gradient across the cooling system is configured to develop a ram pressure recovery higher than the exhaust exit pressure. Thus, many aircraft include a ram air inlet door that is movable between an open position and a closed position. In the open position, the inlet door provides excellent ram air recovery. In the closed position, the inlet door protects the APU from foreign objects when not in use and/or during ground movement. In addition, during flight, the closed door prevents air circulation through the APU when the APU is in not in use. Such air circulation through the APU can cause aircraft drag, and may undesirably cause the APU to windmill uncontrollably.

Although the above-described configuration is generally safe, robust, and reliable, it does suffer certain drawbacks. For example, when the inlet door is in the closed position, the APU compartment and inlet duct are isolated by the door inner surface. However, because the cooling scoop is inside the inlet duct, in the highly unlikely event of a compartment fire, if a portion of the cooling inlet wall burns through, the fire can enter the engine inlet duct violating fire isolation regulations. Although separate and individually operable and isolable inlets could be used, such a configuration can undesirably increase overall system weight and cost since more than one actuator is typically used.

Hence, there is a need for an APU compartment air inlet system that can be sealed when the APU is not operating during in-flight conditions and/or that allows the APU inlet and cooling system inlets to be isolated from each other and/or that does not undesirably increase overall system weight and/or cost. The present invention addresses one or more of these needs.

BRIEF SUMMARY

The present invention provides an auxiliary power unit (APU) compartment air inlet system that can be sealed, via one or more inlet doors driven by a single actuator, during in-flight conditions, and that allows the APU inlet and cooling system inlets to be isolated from each other.

In one embodiment, and by way of example only, an APU compartment multiple air inlet system includes an APU compartment, an APU intake duct, a compartment cooling duct, an inlet door, and an actuator. The APU compartment has a ram air inlet opening formed therein that is configured to receive a flow of ram air. The APU intake duct is mounted within the APU compartment and has an inlet in fluid communication with the ram air inlet opening. The compartment cooling duct is mounted within the APU compartment and has an inlet in fluid communication with the ram air inlet opening. The inlet door is mounted adjacent the ram air inlet opening and is moveable between a closed position and an open position. In the closed position the inlet door at least substantially seals the ram air inlet opening and thereby at least inhibits the flow of ram air into the APU intake duct inlet and the compartment cooling duct inlet. In the open position, the inlet door unseals the ram air inlet opening and thereby allows the flow of ram air into the APU intake duct inlet and the compartment cooling duct inlet. The actuator is coupled to the inlet door and is operable to selectively move the inlet door between the open position and the closed position.

In another exemplary embodiment, an APU compartment multiple air inlet system includes an APU compartment, an APU intake duct, a compartment cooling duct, an APU inlet door, a compartment inlet door, and an actuator. The APU compartment has an APU ram air inlet opening and a compartment ram air inlet opening formed therein. The APU ram air inlet opening and the compartment ram air inlet opening are each configured to receive a flow of ram air. The APU intake duct is mounted within the APU compartment and has an inlet in fluid communication with the APU ram air inlet opening. The compartment cooling duct is mounted within the APU compartment and has an inlet in fluid communication with the compartment ram air inlet opening. An APU inlet door is mounted adjacent the APU ram air inlet opening and is moveable between a closed position and an open position. In the closed position, the APU inlet door at least substantially seals the APU ram air inlet opening and thereby at least inhibits the flow of ram air into the APU intake duct inlet. In the open position, APU inlet door unseals the APU ram air inlet opening and thereby allows the flow of ram air into the APU intake duct inlet. The compartment inlet door is mounted adjacent the compartment ram air inlet opening and is moveable between a closed position and an open position. In the closed position, the compartment inlet door at least substantially seals the compartment ram air inlet opening and thereby at least inhibits the flow of ram air into the compartment cooling duct inlet. In the open position, the compartment inlet door unseals the compartment ram air inlet opening and thereby allows the flow of ram air into the compartment cooling duct inlet. The actuator is coupled to the APU inlet door and the compartment inlet door, and is operable to selectively and simultaneously move the APU and compartment inlet doors between the closed and open positions.

Other independent features and advantages of the preferred APU compartment air inlet system will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
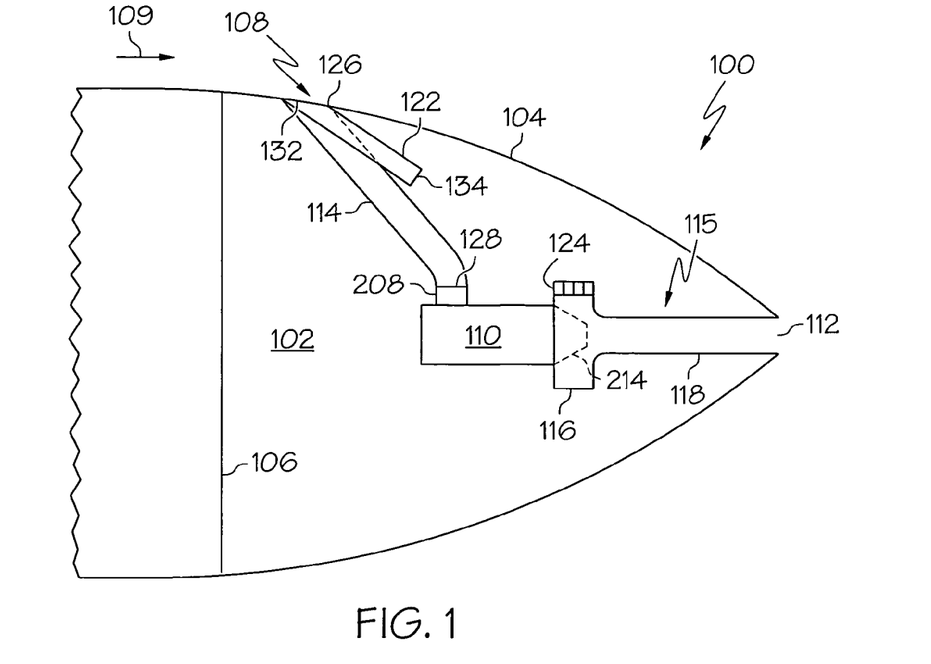
FIG. 1 is a simplified schematic representation of a portion of an aircraft depicting an auxiliary power unit (APU) compartment and various devices and support systems in the APU compartment.

Turning now to FIG. 1, a cross-sectional schematic of a portion of an aircraft 100 is depicted. The aircraft 100 includes an auxiliary power unit (APU) compartment 102 that is defined by an exterior surface 104 and a firewall 106. As is generally known, the firewall 106 separates the APU compartment 102 from other sections of the aircraft 100. In the depicted embodiment, the APU compartment 102 is formed in the tailcone section of the aircraft 100. It will be appreciated, however, that this is merely exemplary, and that the APU compartment 102 could be formed in any one of numerous other sections of the aircraft 100. It will additionally be appreciated that, depending on its location in the aircraft 100, the APU compartment 102 may be defined by more than one firewall 106.

No matter its specific location, the APU compartment 102 includes one or more ram air inlet openings 108, and an exhaust opening 112. As will be described in more detail further below, the one or more ram air inlet openings 108 are configured to selectively receive ram air flow 109, and the exhaust opening 112 provides a point of egress from the APU compartment 102 for APU exhaust and other gasses. As will also be described further below, the ram air flow 109 is supplied to the compartment 102, for cooling purposes, and to an APU 110 that is mounted within the compartment. Before proceeding further, and for completeness, a brief description of an exemplary APU 110 that may be mounted within the compartment 102 will be provided.

Figure 2:
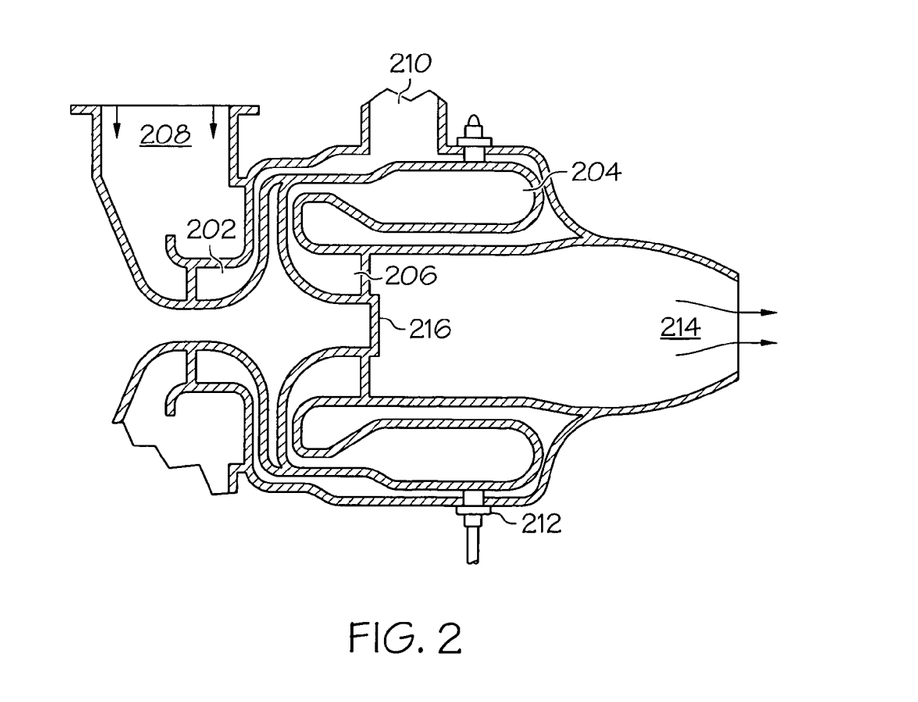
FIG. 2 is a simplified cross section diagram of an APU that may be mounted in the APU compartment of FIG. 1.

With reference now to FIG. 2, an exemplary embodiment of the APU 110 is depicted. The exemplary APU 110 includes a compressor 202, a combustor 204, and a turbine 206. Air is directed into the compressor 202 via an air inlet 208. The compressor 202 raises the pressure of the air and supplies compressed air to both the combustor 204 and, in the depicted embodiment, to a bleed air outlet port 210. In the combustor 204, the compressed air is mixed with fuel that is supplied to the combustor 204 from a non-illustrated fuel source via a plurality of fuel nozzles 212. The fuel/air mixture is combusted, generating high-energy gas, which is then directed into the turbine 206.

The high-energy gas expands through the turbine 206, where it gives up much of its energy and causes the turbine 206 to rotate. The gas is then exhausted from the APU 110 via an exhaust gas outlet nozzle 214. As the turbine 206 rotates, it drives, via a turbine shaft 216, various types of equipment that may be mounted in, or coupled to, the APU 110. For example, in the depicted embodiment the turbine 206 drives the compressor 202. It will be appreciated that the turbine 206 may also be used to drive a generator and/or a load compressor and/or other rotational equipment, which are not shown in FIG. 2 for ease of illustration.

Returning once again to FIG. 1, it is seen that the APU 110, and more specifically the APU compressor inlet 208, is coupled to an APU intake duct 114. It is additionally seen that the APU 110, and more specifically the exhaust gas outlet nozzle 214, is coupled to an exhaust system 115. The APU intake duct 114, as will be described in more detail below, is coupled to selectively receive the ram air flow 109. The exhaust system 115, at least in the depicted embodiment, includes an eductor 116 and an outlet duct 118. The eductor 116 may be variously configured, but in the depicted embodiment it preferably surrounds, and receives the gas that is exhausted from, the exhaust gas outlet nozzle 214. It will be appreciated that in other embodiments, the exhaust gas outlet nozzle 214 may communicate with the eductor 116 via one or more intermediate components such as, for example, a mixer. Nonetheless, the eductor 116 is additionally configured, upon receipt of the exhaust gas, to draw compartment cooling air that is selectively supplied to the APU compartment 102 from a compartment cooling duct 122 through, for example, an oil cooler 124 that is coupled to the eductor 116, and into the exhaust duct 118, which is coupled to, and in fluid communication with, the exhaust opening 112.

As was mentioned above, the APU intake duct 114 is coupled to selectively receive the ram air flow 109. To do so, the APU intake duct 114 includes an inlet 126 that is coupled to selectively receive the ram air flow 109, and an outlet 128 that is coupled to the APU compressor inlet 208. Moreover, while not previously mentioned, it is noted that the air that is selectively supplied to the compartment cooling duct 122 is also via the ram air flow 109. Thus, similar to the APU intake duct 114, the compartment cooling duct 122 includes an inlet 132 that is coupled to receive the ram air flow 109. The compartment cooling duct 122 further includes an outlet 134 that exhausts the received ram air flow 109 into the APU compartment 102.

It will be appreciated that in some configurations the APU intake duct inlet 126 and the compartment cooling duct inlet 132 receive ram air flow 109 from separate ram air inlet openings 108, whereas in other configurations these duct inlets 126, 132 receive ram air flow 109 from the same ram air inlet opening 108. In the configurations in which the duct inlets 126, 132 receive ram air flow 109 from separate ram air inlet openings 108, individual inlet doors are provided to selectively allow and inhibit ram air flow 109 into the duct inlets 126, 132. In the configurations in which the duct inlets 126, 132 receive ram air flow from the same ram air inlet openings 108, a single inlet door is provided to selectively allow and inhibit ram air flow 109 into the duct inlets 126, 132. In both configurations, however, a single actuator is used to position the inlet door(s). An exemplary embodiment in which the duct inlets 126, 132 receive ram air flow 109 from separate ram air inlet openings 108 will now be described. Thereafter, exemplary embodiments in which the duct inlets 126, 132 receive ram air flow 109 from the same ram air inlet opening 108 will be described.

Figure 3:
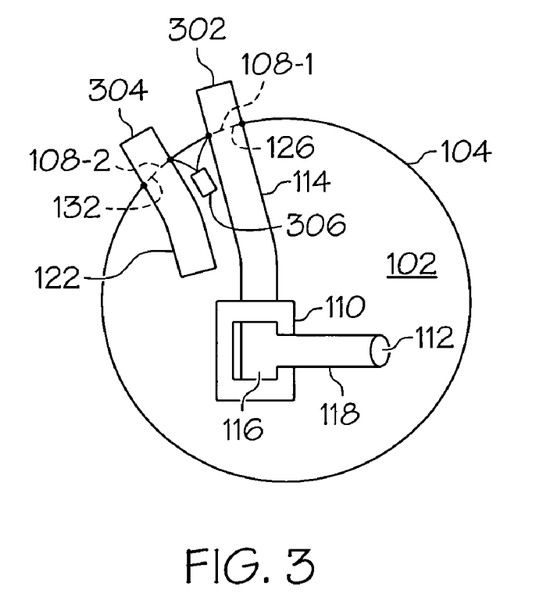
FIGS. 3 and 4 are schematic representations of an APU compartment with an inlet isolation system, according to a first embodiment of the invention.
Figure 4:
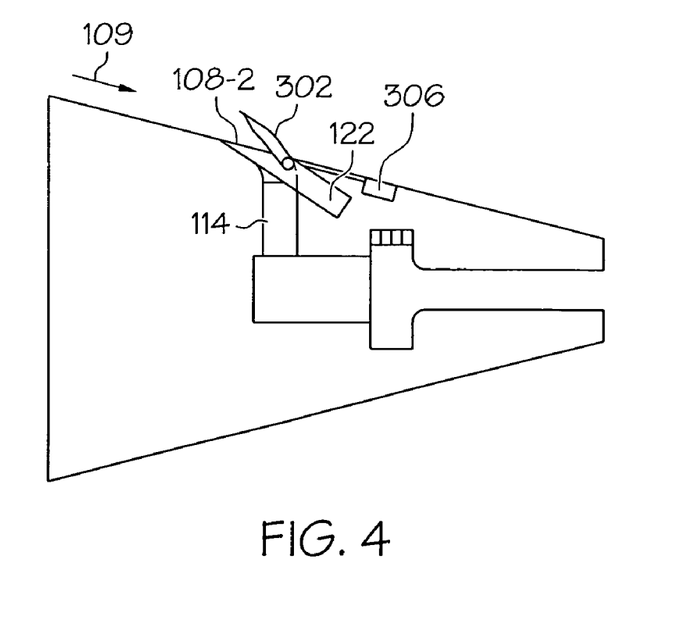

With reference now to FIGS. 3 and 4, an embodiment in which the duct inlets 126, 132 selectively receive ram air flow 109 from separate ram air inlet openings 108 is depicted. As illustrated therein, the APU compartment 102 includes two independent inlet openings 108, an APU ram air inlet opening 108-1 and a compartment ram air inlet opening 108-2. An APU inlet door 302 is mounted adjacent to the APU ram air inlet opening 108-1, and a compartment inlet door 304 is mounted adjacent the compartment ram air inlet opening 108-2. It will be appreciated that the APU inlet door 302 and the compartment inlet door 304 may be mounted adjacent the APU ram air inlet opening 108-1 and the compartment ram air inlet opening 108-2, respectively, in any one of numerous configurations and at any one of numerous specific locations. For example, the APU and compartment inlet doors 302, 304 could be configured to rotate or translate. In the depicted embodiment, however, the APU and compartment inlet doors 302, 304 are each configured to rotate. Moreover, the APU and compartment inlet doors 302, 304 could, for example, be mounted on the aircraft exterior surface 104, on a non-illustrated structure within the APU compartment 102, or on the APU or compartment cooling ducts 114, 122, respectively.

No matter the specific mounting configuration and location, the APU and compartment inlet doors 302, 304 are both moveable between a closed position and an open position. In the closed position, the APU inlet door 302 at least substantially, but preferably entirely, seals the APU ram air inlet opening 108-1. As a result, ram air flow 109 is at least inhibited, and preferably prevented, from entering the APU intake duct inlet 126. In the open position, which is the position shown in FIGS. 3 and 4, the APU inlet door 302 unseals the APU ram air inlet opening 108-1, thereby allowing ram air flow 109 to enter the APU intake duct inlet 302. Similarly, the compartment inlet door 304, when it is in the closed position, at least substantially, and preferably entirely, seals the compartment ram air inlet opening 108-2, and thereby at least inhibits, and preferably prevents, ram air flow 109 into the compartment cooling duct inlet 122. In the closed position, the compartment inlet door 304 unseals the compartment ram air inlet opening 108-2, thereby allowing ram air flow 109 to enter the compartment cooling duct inlet 122.

As FIGS. 3 and 4 also depict, the APU and compartment inlet doors 302, 304 are each coupled to the same, single actuator 306. The actuator 306 may be mounted adjacent to, or remote from, the inlet doors 302, 304, and may be implemented as any one of numerous types of actuators 306. For example, the actuator 306 may be an electromechanical, a hydraulic, or a pneumatic type of actuator, with either a single output or a dual output. No matter its particular location, configuration, and type, the actuator 306 is configured, upon receiving electric, hydraulic, or pneumatic drive power, to supplies a drive force that simultaneously moves the inlet doors 302, 304 to their closed positions or to an open position.

It will be appreciated that although the two inlet openings 108-1, 108-2, and thus the two inlet doors 302, 304, are depicted as being radially staggered, and disposed at substantially identical axial locations on the aircraft exterior surface 104, this is merely exemplary of a particular embodiment. In other embodiments, the inlet openings 108-1, 108-2 and inlet doors 302, 304 may be axially staggered, and disposed at either different or substantially identical radial locations on the aircraft exterior surface 304. It will additionally be appreciated that when the inlet doors 302, 304 are axially staggered, the actuator 306 is preferably configured with a linkage rod that, upon receiving electric, hydraulic, or pneumatic drive power, supplies a drive force that cranks the inlet doors 302, 304 to their open and closed positions.

The use of a single actuator 306 provides an APU compartment multiple air inlet system having a relatively lower cost and lower weight, as compared to current systems. The inlet doors 302, 304, in addition to sealing the inlet openings 108-1, 108-2 when in their closed positions, isolate the two inlets 108-1, 108-2 and the associated ducts 114, 122 from one another in the highly unlikely event of a fire within the APU compartment 102. Thus, the compartment cooling duct 122 can be made of thin wall, lightweight material since, in the highly unlikely event of an APU compartment fire, even if the compartment cooling duct 122 were to burn through, the fire would be maintained within the APU compartment 102 fire zone, and would not enter the APU intake duct 114. The embodiments representative of the one depicted in FIGS. 3 and 4 further allow the two inlet doors 302, 304 to be sized independently, according to the air flow needs of the APU 110 and the loads supplied by the compartment cooling duct 122. Thus, the total door surface that provides a low drag design can be optimized.

Figure 5:
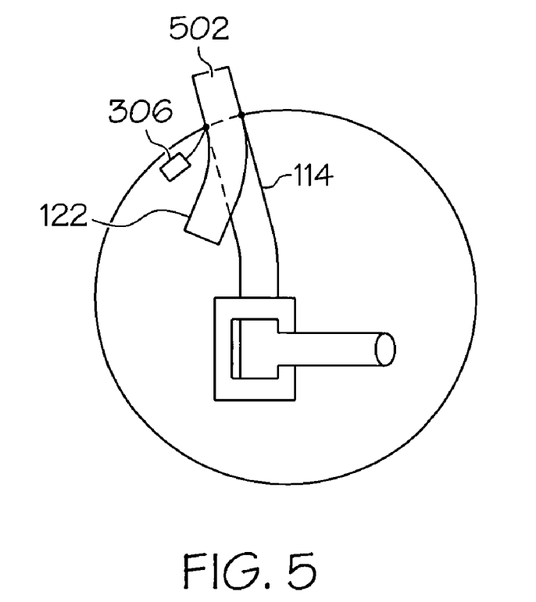
FIGS. 5 and 6 are schematic representations of an APU compartment with an inlet isolation system, according to a second embodiment of the invention.
Figure 6:
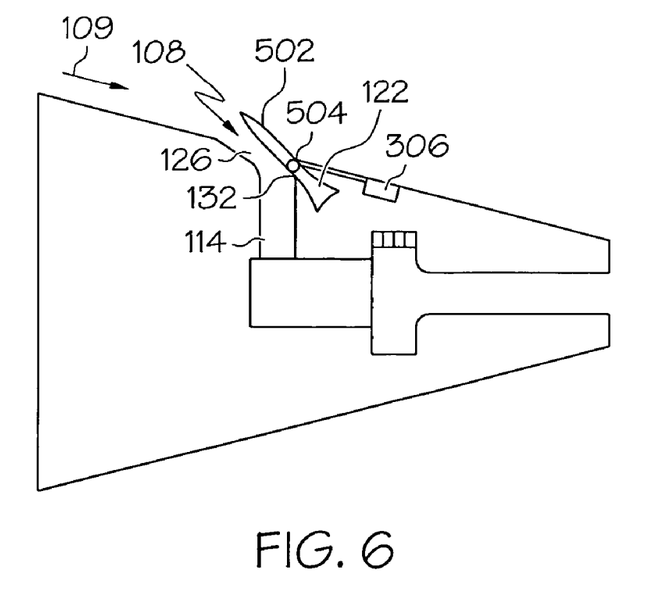

With reference now to FIGS. 5 and 6, an embodiment in which the duct inlets 126, 132 selectively receive ram air flow 109 from the same ram air inlet opening 108 is depicted. In this embodiment a single inlet door 502 to serves both the APU intake duct 114 and the compartment cooling duct 122. Similar to the previously described embodiments, the inlet door 502 is mounted adjacent to the ram air inlet opening 108. Similarly, it will be appreciated that the inlet door 502 may be mounted adjacent the ram air inlet opening 108 in any one of numerous configurations and at any one of numerous specific locations. For example, the inlet door 502 could be configured to rotate or translate. In the depicted embodiment, however, the inlet door 502 is configured to rotate. Moreover, the inlet door 502 could, for example, be mounted on the aircraft exterior surface 104, on a non-illustrated structure within the APU compartment 102, or on the APU or compartment cooling ducts 114, 122, respectively.

No matter the specific mounting configuration and location, the inlet door 502 is moveable between a closed position and an open position. In the closed position, the inlet door 502 at least substantially, but preferably entirely, seals the ram air inlet opening 108. As a result, ram air flow 109 is at least inhibited, and preferably prevented, from entering the both APU intake duct inlet 126 and the compartment cooling duct inlet 132. In the open position, which is the position shown in FIGS. 5 and 6, the inlet door 502 unseals the ram air inlet opening 108, thereby allowing ram air flow 109 to enter both the APU intake duct inlet 126 and the compartment cooling duct inlet 132.

Figure 7:
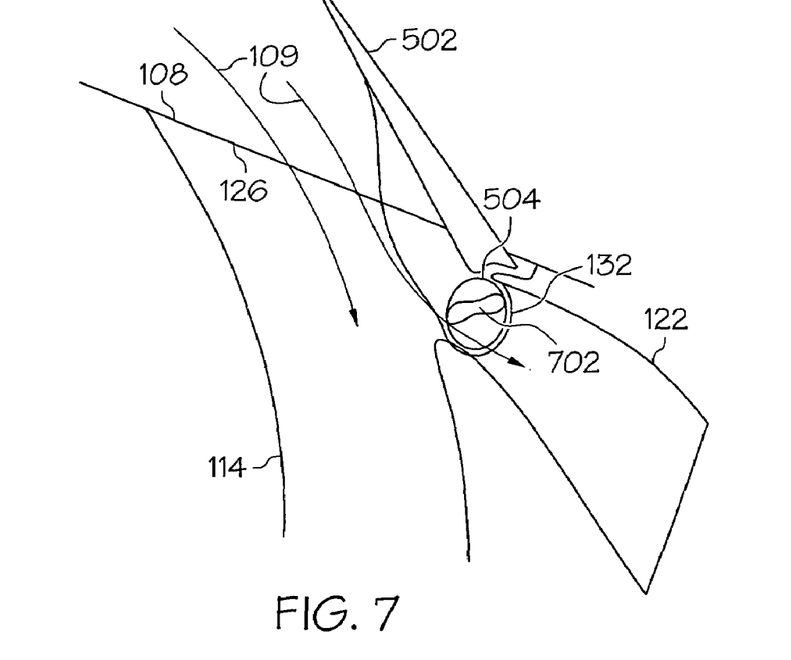
FIGS. 7 and 8 are close-up schematic representations of the system of FIGS. 5 and 6, depicting an embodiment of an inlet door in an open and closed position, respectively.
Figure 8:
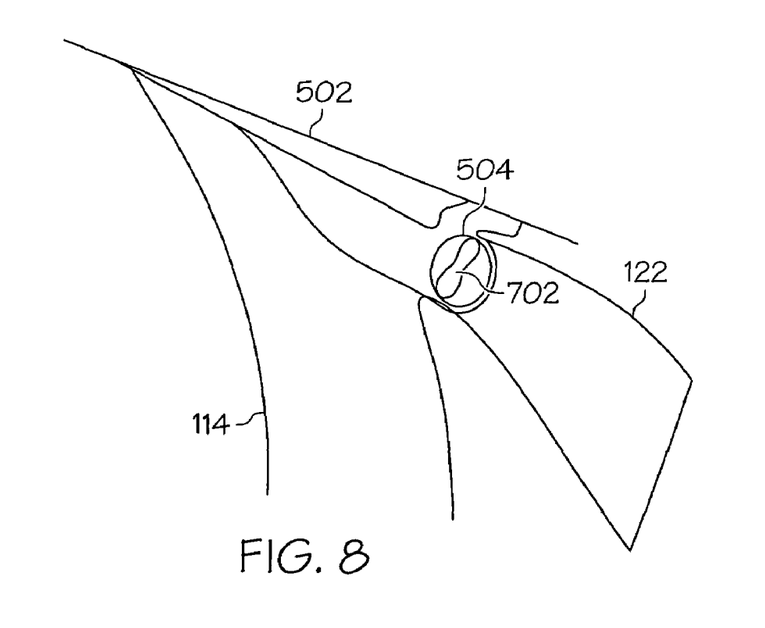

As was noted above, the inlet door 502 is preferably configured to rotate. In this regard, the inlet door 502 is preferably mounted on a hinge 504. In one embodiment, which is shown more clearly in FIGS. 7 and 8, the hinge 504 is disposed, at least partially, with the compartment cooling duct 122, preferably adjacent the compartment cooling duct inlet 132. The hinge 504 includes a valve section 702 that extends across the compartment cooling duct 122. The hinge valve section 702 defines a valve that, as depicted in FIG. 8, at least substantially, and preferably entirely, seals the compartment cooling duct inlet 132, and thereby isolating the APU intake duct 114 from the compartment cooling duct 122, when the inlet door 702 is in the closed position and, as depicted in FIG. 7, unseals the compartment cooling duct inlet 132 when the inlet door 702 is in the open position. When the inlet door 702 is in the open position, the valve section 702 is configured to provide sufficient flow area into the compartment cooling duct 122.

Figure 9:
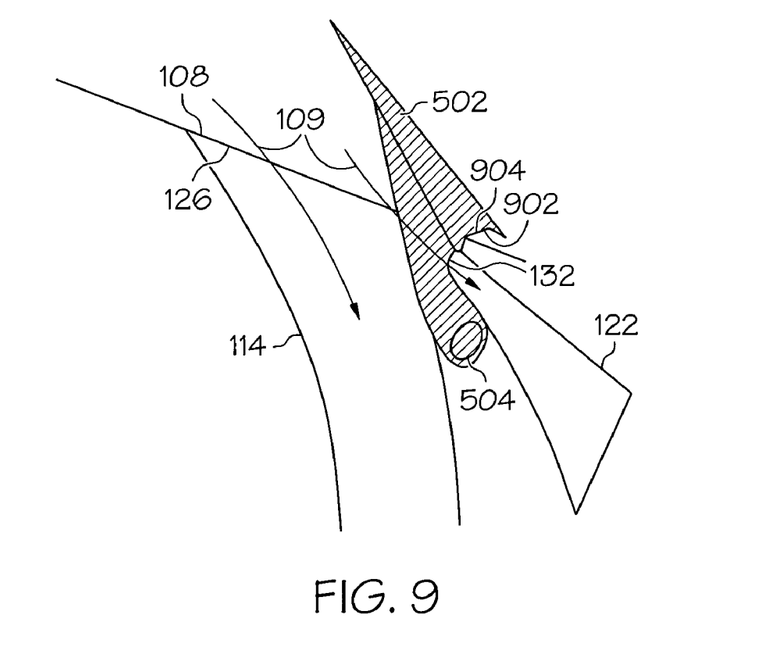
FIGS. 9 and 10 are close-up schematic representations of the system of FIGS. 5 and 6, depicting an alternative embodiment of an inlet door in an open and closed position, respectively.
Figure 10:
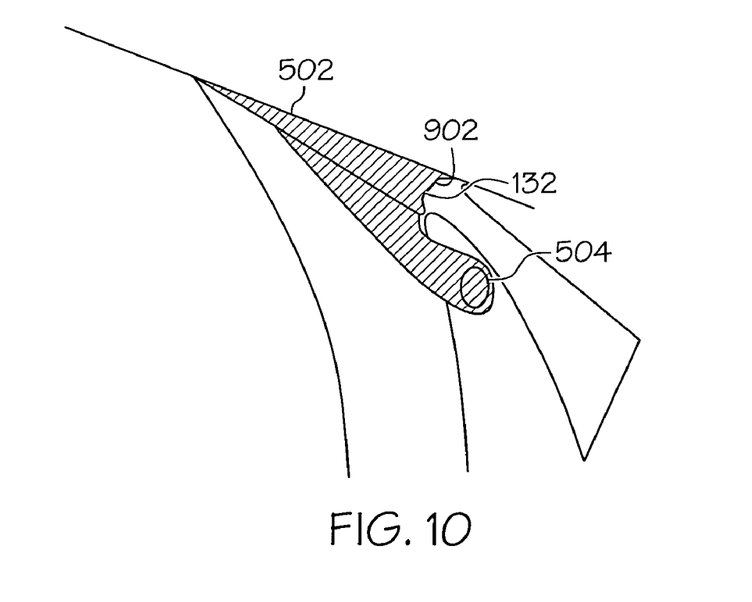

In another single ram air inlet embodiment, which is depicted in FIGS. 9 and 10, the hinge 504 is not used to seal and unseal the compartment cooling duct 122. Rather, in this embodiment, a portion of the inlet door 502 is configured to engage and seal the compartment cooling duct inlet 132. In particular, the inlet door 502 includes one or more back face seals 902 that are coupled to a back face 904 of the inlet door 502. The inlet door back face seals 902 and the compartment cooling duct inlet 132 are configured such that, as the inlet door 502 is rotated to the open position (FIG. 9), the APU intake duct inlet 126 and the compartment cooling duct inlets 132 each receive the ram air flow 109. When the inlet door 502 is rotated to the closed position (FIG. 10), the inlet door back face seals 902 engage against, and seal, the compartment cooling inlet 132, thereby isolating the compartment cooling duct 122 from the APU intake duct 114. It will thus be appreciated that in this embodiment the hinge 504 is preferably mounted such that it does not extend across either of the ducts 114, 122.

With each of the above described configurations, a single inlet door 502 is used to selectively supply ram air flow 109 to both the APU intake duct 114 and the compartment cooling duct 122. Since a single inlet door 502 is used, a single actuator 306 is also used to operate the inlet door 502. As a result, the air inlet system cost, weight, and complexity can be kept to a relative minimum. Moreover, as with the first described embodiment, these latter configurations sufficiently isolate the APU intake duct 114 from the compartment cooling duct 122 when the inlet door 502 is in the closed position.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. An auxiliary power unit (APU) compartment multiple air inlet system, comprising:
    an APU compartment having a ram air inlet opening formed therein, the ram air inlet opening configured to receive a flow of ram air;
    an APU intake duct mounted within the APU compartment and having an inlet in fluid communication with the ram air inlet opening;
    a compartment cooling duct mounted within the APU compartment and having an inlet in fluid communication with the ram air inlet opening;
    a hinge rotationally mounted on the compartment cooling duct and including a valve section that extends across the compartment cooling duct adjacent the compartment cooling duct inlet;
    an inlet door mounted adjacent the ram air inlet opening and coupled to the hinge, the inlet door moveable between (i) a closed position, in which the inlet door at least substantially seals the ram air inlet opening and thereby at least inhibits the flow of ram air into the APU intake duct inlet and the compartment cooling duct inlet, and (ii) an open position, in which the inlet door unseals the ram air inlet opening and thereby allows the flow of ram air into the APU intake duct inlet and the compartment cooling duct inlet; and
    an actuator coupled to the inlet door and operable to selectively move the inlet door between the open position and the closed position,
    wherein the valve section defines a valve that at least substantially seals the compartment cooling duct inlet when the inlet door is in the closed position, and unseals the compartment cooling duct inlet when the inlet door is in the open position.

2. The system of claim 1, wherein:
    when the inlet door is in the closed position, the APU intake duct inlet is not in fluid communication with the compartment cooling duct inlet; and
    when the inlet door is in the open position, the APU intake duct inlet is in fluid communication with the compartment cooling duct inlet.

3. The system of claim 1, wherein the actuator is a linear actuator.

4. The system of claim 1, wherein the actuator is a rotary actuator.

5. The system of claim 1, further comprising:
    an APU mounted within the APU compartment, the APU having at least an air inlet in fluid communication with the APU intake duct.

6. An auxiliary power unit (APU) compartment multiple air inlet system, comprising: an APU compartment having a ram air inlet opening formed therein, the ram air inlet opening configured to receive a flow of ram air; an APU intake duct mounted within the APU compartment and having an inlet in fluid communication with the ram air inlet opening; a compartment cooling duct mounted within the APU compartment and having an inlet in fluid communication with the ram air inlet opening; an inlet door mounted adjacent the ram air inlet opening and moveable between (i) an open position, in which the APU intake duct inlet is in fluid communication with the compartment cooling duct inlet, and (ii) a closed position, in which the APU intake duct inlet is not in fluid communication with the compartment cooling duct inlet; an actuator coupled to the inlet door and operable to selectively move the inlet door between the open position and the closed position; and a hinge rotationally mounted on the compartment cooling duct and having the inlet door coupled thereto, whereby the inlet door is rotationally movable, wherein the hinge includes a valve section that extends across the compartment cooling duct adjacent the compartment cooling duct inlet; the valve section defines a valve that at least substantially seals the compartment cooling duct inlet when the inlet door is in the closed position, and unseals the compartment cooling duct inlet when the inlet door is in the open position.

7. The system of claim 6, wherein:
the inlet door includes a back face;
the system further comprises one or more back face seals coupled to the inlet door back face;
the one or more inlet door back face seals at least substantially seal the compartment cooling duct inlet when the inlet door is in the closed position, to thereby at least inhibits the flow of ram air into the compartment cooling duct inlet.

8. The system of claim 6, wherein:
when the inlet door is in the closed position, the inlet door at least substantially seals the ram air inlet opening and thereby at least inhibits the flow of ram air into the APU intake duct inlet and the compartment cooling duct inlet; and
when the inlet door is in the open position, the inlet door unseals the ram air inlet opening and thereby allows the flow of ram air into the APU intake duct inlet and the compartment cooling duct inlet.

9. The system of claim 6, wherein the actuator is a linear actuator.

10. The system of claim 6, wherein the actuator is a rotary actuator.

11. An auxiliary power unit (APU) compartment multiple air inlet system, comprising:

an APU compartment having an APU ram air inlet opening and a compartment ram air inlet opening formed therein, the APU ram air inlet opening and the compartment ram air inlet opening each configured to receive a flow of ram air;
an APU intake duct mounted within the APU compartment and having an inlet in fluid communication with the APU ram air inlet opening;
a compartment cooling duct mounted within the APU compartment and having an inlet in fluid communication with the compartment ram air inlet opening;
an APU inlet door mounted adjacent the APU ram air inlet opening and moveable between (i) a closed position, in which the APU inlet door at least substantially seals the APU ram air inlet opening and thereby at least inhibits the flow of ram air into the APU intake duct inlet, and (ii) an open position, in which the APU inlet door unseals the APU ram air inlet opening and thereby allows the flow of ram air into the APU intake duct inlet;
a compartment inlet door mounted adjacent the compartment ram air inlet opening and moveable between (i) a closed position, in which the compartment inlet door at least substantially seals the compartment ram air inlet opening and thereby at least inhibits the flow of ram air into the compartment cooling duct inlet, and (ii) an open position, in which the compartment inlet door unseals the compartment ram air inlet opening and thereby allows the flow of ram air into the compartment cooling duct inlet; and
an actuator coupled to the APU inlet door and the compartment inlet door, the actuator operable to selectively and simultaneously move the APU and compartment inlet doors between the closed and opened positions.

12. The system of claim 11, wherein the actuator is a linear actuator.

13. The system of claim 11, wherein the actuator is a rotary actuator.

* * * * *